G. Nimmo,
Crucible Mold.
N°49,140.  Patented Aug. 1, 1865.
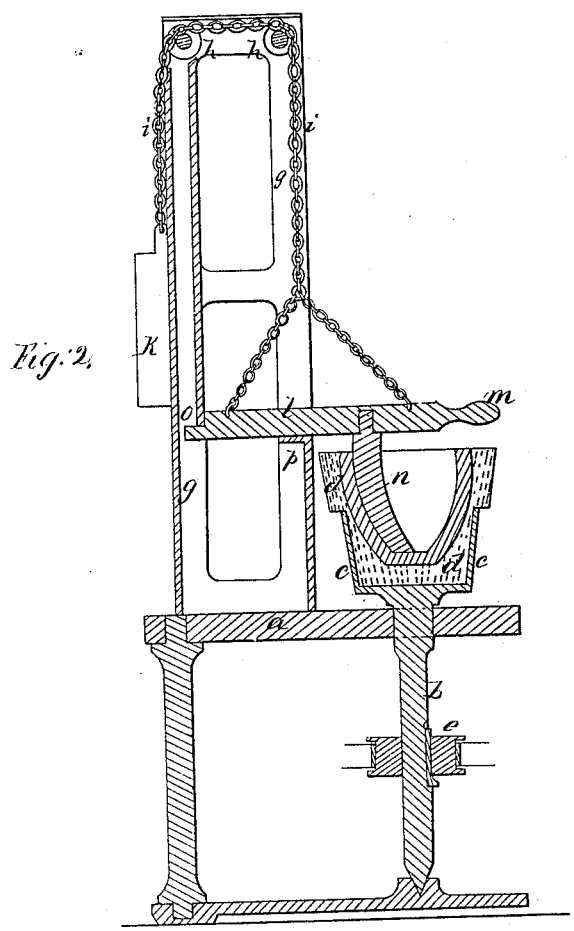
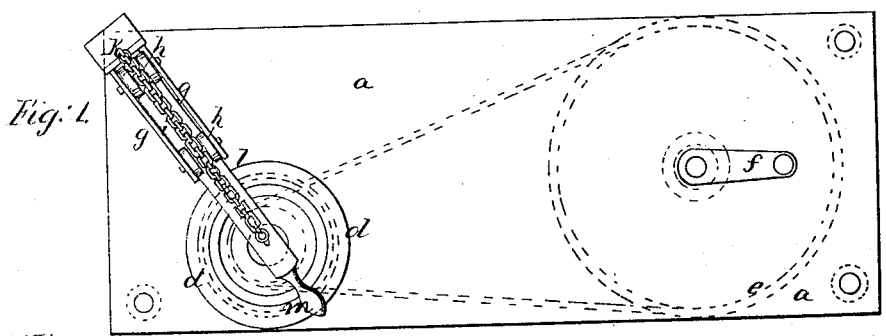
Witnesses:  Inventor;
George Nimmo

UNITED STATES PATENT OFFICE.

GEORGE NIMMO, OF JERSEY CITY, NEW JERSEY.

IMPROVEMENT IN MOLDING CRUCIBLES.

Specification forming part of Letters Patent No. 49,140, dated August 1, 1865.

*To all whom it may concern:*

Be it known that I, GEORGE NIMMO, of Jersey City, in the county of Hudson and State of New Jersey, have invented, made, and applied to use a certain new and useful Improvement in Molding Crucibles and Pots; and I do hereby declare the following to be a full, clear, and exact description of the said invention, reference being had to the annexed drawings, making part of this specification, wherein—

Figure 1 is a plan view of my machine for molding crucibles, and Fig. 2 is a section elevation of the same.

Similar marks of reference denote the same parts.

Crucibles have heretofore been made in a mold by a pressing instrument, as may be seen by reference to Letters Patent granted October 26, 1852, to John Akrill.

Difficulty has heretofore been experienced in removing these crucibles from the mold in consequence of the adhesive nature of the black-lead compound or mixture employed for such crucibles. The amount of water, also, that is required to make the mixture sufficiently plastic causes the material frequently to crack and break in shrinking as it dries.

The nature of my said invention consists in the manufacture of crucibles in a plaster mold, which gives shape to the pot externally and absorbs the moisture from the pot, causing it to dry uniformly and at the same time shrink away from the mold, preventing the air acting on the outside of the pot until after the moisture has been mostly absorbed, and prevents the pot from splitting or cracking from unequal contraction in drying. I mount my plaster mold in a revolving chuck and employ a rib attached to a lever for spreading the plastic crucible material on the inside of the mold and at the same time hardening, consolidating, and polishing the crucible on the inside by means of said rib.

In the drawings, $a$ is a bed carrying the vertical spindle $b$, on the upper end of which is the hollow chuck $c$, into which the plaster mold $d$ fits, and these parts are revolved by a belt to a wheel, $e$, and crank $f$, (see Fig. 1,) or by any other competent means. Near the chuck $c$ is an upright frame, $g$, with rollers $h\ h$, over which the chain or rope $i$ passes, on one end of which is the counter-weight $k$, and on the other the lever $l$, having a handle, $m$, at one end and carrying the rib $n$. This lever $l$ is guided by the upright frame $g$, and when not in use is drawn up by the weight $k$. The crucible material is placed in the plaster mold $d$ and partially spread by hand or by a conical muller. The back end of the lever $l$ is then brought beneath the stop or fulcrum $o$ and pressed down until the lever takes a stop, $p$. The rib $n$ on the lever $l$ smooths, compresses, hardens and polishes the interior of the mold, forming a perfect crucible, possessing great strength and beauty. At the same time there is great uniformity in the crucibles made in this manner. The crucible and mold are to be lifted off the chuck and another mold introduced in the chuck and the operation repeated.

The crucible and mold are set aside. When the plaster of the mold has absorbed the moisture from the crucible and the crucible has contracted away from the mold and become sufficiently dry to be exposed to the air without risk of cracking, the crucible is to be removed and dried in any usual manner, and may be baked or burned.

What I claim and desire to secure by Letters Patent is—

1. Manufacturing crucibles in a plaster mold, in the manner and for the purposes specified.

2. Lever $l$ and rib $n$, applied in the manner specified to form the interior of a crucible contained within a revolving mold, as set forth.

3. The combination of the revolving chuck $c$, plaster mold $d$, lever $l$, and rib $n$, as and for the purposes specified.

4. Mounting the lever $l$ and rib $n$ in the frame $g$ in the manner specified, in combination with the counterpoise $k$, fulcrum $o$, and stop $p$, for determining the size of the interior of the crucible, as specified.

In witness whereof I have hereunto set my signature this 20th day of June, A. D. 1865.

GEORGE NIMMO.

Witnesses:
 CHAS. H. SMITH,
 JAS. E. SERRELL, Jr.